United States Patent
Simon et al.

[11] Patent Number: 5,493,443
[45] Date of Patent: Feb. 20, 1996

[54] LENS FOR A FT-RAMAN MICROSCOPE

[75] Inventors: Arno Simon; Reiner Schübel, both of Karlsruhe, Germany

[73] Assignee: Bruker Analytisch MeBtechnik GmbH, Germany

[21] Appl. No.: 165,254

[22] Filed: Dec. 10, 1993

[30] Foreign Application Priority Data

Dec. 19, 1992 [DE] Germany ............ 42 43 144.1

[51] Int. Cl.⁶ .............. G02B 21/00; G02B 13/14; G01J 3/44
[52] U.S. Cl. .............. 359/368; 359/355; 356/301
[58] Field of Search ................. 359/351, 355, 359/356, 385, 858, 859, 846; 356/301

[56] References Cited

U.S. PATENT DOCUMENTS

| | | | |
|---|---|---|---|
| 2,661,658 | 12/1953 | Dyson | 88/39 |
| 4,594,509 | 6/1986 | Simon et al. | 359/356 |
| 4,758,088 | 7/1988 | Doyle | 359/385 |

FOREIGN PATENT DOCUMENTS

| | | | |
|---|---|---|---|
| 0116321 | 8/1984 | European Pat. Off. | G01N 21/35 |
| 1302346 | 1/1971 | Germany | G02B 21/16 |
| 1598667 | 6/1971 | Germany . | |
| 4021955 | 2/1991 | Germany | H01S 3/16 |
| 4005878 | 8/1991 | Germany | G01N 21/65 |

OTHER PUBLICATIONS

"Holographic Optical Components for Laser Spectroscopy Applications" from Harry Owen, distributed on the conference Holographics International '92 Jul. 26th to 29th 1992, London, England.

FT-Raman Microscopy: Discussion and Preliminary Results vol. 43, No. 1, 1989, pp. 11 to 15.

*Primary Examiner*—Paul M. Dzierzynski
*Assistant Examiner*—Audrey Y. Chang
*Attorney, Agent, or Firm*—Walter A. Hackler

[57] ABSTRACT

In a Raman microscope, in particular for a Fourier transform (FT) spectrometer with a lens for magnified imaging of a point-shaped region (1) on a surface of a measuring sample (2) and with a laser for irradiating laser radiation onto the point-shaped region (1), the laser radiation is in the infrared (IR), preferentially in the near-infrared (NIR) region and the lens is a Cassegrain mirror-lens (3, 4) with a convex mirror (3) arranged rotationally symmetrically to an optical axis (5) and with a concave mirror (4) which is likewise rotationally symmetric to the optical axis (5) of the lens, whereby the focal point of the concave mirror (4), lying on the optical axis (5), coincides with the point-shaped region (1) on the surface of the measuring sample (2). In this fashion distortion-free NIR Raman spectra can be taken with simple optical elements.

9 Claims, 4 Drawing Sheets

LENS FOR A FT-RAMAN MICROSCOPE

BACKGROUND OF THE INVENTION

The invention concerns a Raman microscope, in particular for a Fourier transform (FT) spectrometer with a lens for magnified imaging of a point-shaped region on the surface of a measuring sample, with means for irradiation of laser radiation onto the point-shaped region and with means for detecting the emitted Raman radiation.

A Raman microscope of this kind is, for example, known in the art from the conference contribution "Holographic Optical Components for Laser Spectroscopy Applications" by Harry Owen, distributed at the conference "Holographics International '92", 26th–29th Jul. 1992, London, England.

Raman scattering is a very weak process with which a photon interacts with a molecule and is inelastically scattered. The photon loses or gains energy in this process which results in a frequency shift of the scattered photon. This frequency shift corresponds to rotational, vibrational or electronic state transitions of the molecule from which the photon was scattered. For vibrational transitions the scattering probability is approximately $10^{-7}$. In contrast thereto, the known Rayleigh elastic scattering process with which no energy transfer takes place during the interaction between the photon and the molecule, is substantially stronger. The Raman spectroscopy has become a very sensitive and highly predictive method for the determination of chemical and molecular structures in fluids, solids, and on surfaces. It provides statements which are complementary to the usual infrared (IR) spectroscopy since with Raman processes, molecular transitions are possible which are forbidden in the processes of IR spectroscopy.

In recent years near-infrared (NIR) lasers, for example, the Neodym-YAG laser have also found increasing application for Raman spectroscopy, in particular in Fourier transform (FT) spectrometers. Such a FT-IR spectrometer is, for example, described in the company publication "IFS 66" of Bruker Analytische MeBtechnik GmbH. The fluorescence light in the visible region, which is extremely disruptive to classical Raman experiments, can be largely avoided by the utilization of NIR lasers for the excitation of the Raman processes.

For the investigation of very small or inhomogeneous samples with the assistance of Raman spectroscopy microscopes are utilized in Raman spectrometers with appropriate lenses for the magnified imaging of a point-shaped region on the surface of the measuring sample. Such a microscope lens, usually constructed from optical lenses, is described in the two publications mentioned above. Such a commercially available glass lens, which is optimized for the visible wavelength region and utilized for the introduction of focused laser light onto the surface of the sample as well as for the detection of the emitted Raman spectrum, has, however, the disadvantage of chromatic aberration leading to a distortion of the spectra taken. For this reason these glass lenses are only usable in a very limited optical region.

To compensate for the chromatic aberrations within a particular wavelength region, conventional glass lenses are given an anti-reflecting coating. This only works, however, in the visible wavelength region and the lens leads to imaging errors in the NIR region. Although an anti-reflecting coating along with a correction for the known glass lenses in the IR region would be in principle possible, such a lens would, however, be very difficult to produce and the effectiveness of the correction would be limited to a small section of the IR wavelength region. For this reason, IR glass lenses with anti-reflecting coatings are rarely available commercially and are extremely expensive.

It is therefore the purpose of the present invention to introduce a Raman microscope of the above mentioned kind which is constructed in a simple fashion from commercially readily available optical components and which does not exhibit chromatic aberration.

SUMMARY OF THE INVENTION

This purpose is achieved in accordance with the invention in that the laser radiation lies in the infrared (IR), preferentially in the near-infrared (NIR) region and that the lens is a Cassegrain mirror-lens with a convex mirror arranged rotationally symmetric with respect to an optical axis and with a concave mirror which is likewise rotationally symmetric to the optical axis of the lens whereby the focal point of the concave mirror lies on the optical axis and coincides with the point-shaped region on the surface of the measuring sample. The Cassegrain mirror-lens which, for example, is known in the art from the publication DE-OS 33 03 140 is achromatic and thereby does not lead to any distortions in the NIR Raman spectrum. Although the inventive solution may appear, retrospectively, to be astonishingly simple, up to this point in time no Raman microscope has been proposed with which a Cassegrain lens has been utilized.

In an embodiment of the invention, the means for irradiating the laser radiation are so configured that the laser radiation is initially incident on the reflecting surface of the convex mirror whereby the essential part of the laser radiation is irradiated at a separation from the optical axis of the Cassegrain mirror-lens. Due to the configuration of the means of irradiation of the laser radiation at the side of the Cassegrain mirror-lens which faces away from the sample, no geometrical problems occur with regard to the positioning of the coupled-in mirror or mirrors. Due to the radiation of at least a significant portion of the laser light with a sideward displacement from the optical axis of the lens no or very little laser light is coupled into the optical path of the scattered Raman light emerging from the lens which leads to a detector.

A preferred possibility for coupling-in is given when the laser radiation is deflected onto the concave mirror via a semi-permeable planar mirror which is arranged on the optical axis at a separation from the Cassegrain mirror-lens on the side facing away from the measuring sample at an angle with respect to the optical axis, whereby the laser radiation is divergently spread out in such a fashion that it is incident on the convex mirror in the form of a cone-shaped beam which is symmetric with respect to the optical axis and whereby the cone angle is so chosen that the laser radiation is focused onto the point-shaped region after passing through the Cassegrain mirror-lens.

In this fashion the Cassegrain mirror-lens is completely illuminated by the incident laser light which is optimally utilized for Raman excitation on the sample surface.

In a preferred improvement of this embodiment the semi-permeable planar mirror is transmitting for the Raman radiation in one observational wavelength region and is reflecting for the irradiated NIR laser radiation. In this fashion the coupled-in laser radiation can be rendered fully useful and without losses for the Raman measurement.

In another embodiment the coupling-in is effected in that the laser radiation is deflected onto the convex mirror as a parallel beam with small beam diameter via a completely reflecting planar mirror, arranged sidewardly displaced with respect to the optical axis and on the side of the Cassegrain mirror-lens facing away from the sample, under such an angle relative to the optical axis that the parallel beam is incident on the point-shaped region after passing through the Cassegrain mirror-lens. This configuration also prevents a reflection of the coupled-in laser light in the direction onto the detector configuration of the spectrometer, whereby a portion of the Raman radiation coming from the Cassegrain mirror-lens is, however, likewise collimated out by the fully reflecting planar mirror. The coupled-in laser light, which can be a very thin cross section high intensity beam, travels, in this embodiment, preferentially along the envelope surface of that optical cone which, during normal operation of the Cassegrain mirror-lens with visible light, is irradiated with an opening angle which allows for as great an illumination as possible of the convex mirror, the optical cone being focused onto a point-shaped region on the sample surface by the mirror lens.

In a particularly preferred embodiment the coupling-in of the laser radiation is effected in that the means for irradiating the laser radiation include a reflecting element arranged on the optical axis between the sample and the Cassegrain mirror-lens with the assistance of which a parallel laser beam which is irradiated largely transverse to the optical axis can be deflected along the optical axis onto the point-shaped region on the surface of the measuring sample. In this extremely simple geometrical configuration no losses of laser radiation incident on the sample take place due to scattering or absorption in the lens. Furthermore, no beam-splitter is needed in the optical path of the Raman microscope which would normally lead to additional loss of scattered Raman light.

In a particularly advantageous improvement of this embodiment the reflecting element exhibits a spatial extent transverse to the optical axis which is less than that of the convex mirror of the Cassegrain mirror-lens. In this fashion the reflector element lies in the shadow of the convex mirror so that the yield of Raman light emanating from the sample is not attenuated by the reflector element.

In an advantageous embodiment, the reflecting element is focusing in order to achieve a higher radiation density of irradiated laser light on the surface of the sample, and, in particular, focuses the incident laser radiation onto the point-shaped region on the surface of the measuring sample.

In this fashion, in particular, an improved spatial resolution of the FTIR Raman spectrometer is achieved.

The focusing reflector element can include a planar mirror arranged at an angle with respect to the optical axis as well as a focusing lens configured in the optical path of the laser radiation preferentially, as viewed in the direction of the beam, before the planar mirror.

In contrast thereto, an embodiment is preferred with which the reflecting element is a parabolic mirror which is preferentially arranged at an angle of 45° with respect to the optical axis. The injection of the laser beam thereby transpires at 90° with respect to the optical axis. In this advantageous solution only one optical element is needed for deflecting the beam and for focusing the incident laser beam so that the losses can be kept particularly low.

The invention is more closely described and explained below in the embodiments represented in the drawing. The features which can be extracted from the description and the drawing can be used either individually or collectively in arbitrary combination in other embodiments of the invention.

DESCRIPTION OF THE PREFERRED EMBODIMENT

Figure 1A:
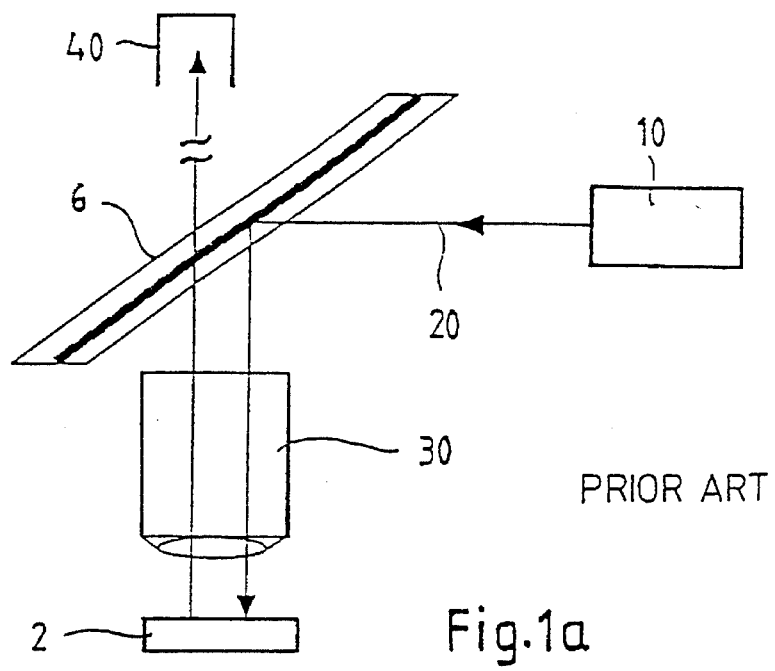
FIG. 1a shows a schematic diagram of the optical path in a Raman microscope with a glass lens according to prior art.

With the optical path through a conventional Raman microscope as represented in FIG. 1a a laser beam 20 from a laser 10 is deflected via a semi-permeable or dichroitic mirror 6 through a glass lens 30 onto a sample 2. The Raman (and Rayleigh) radiation which is scattered back from the sample surface through the glass lens 30 now travels through the glass lens 30 in the opposite direction, passes through the semi-permeable mirror 6 and after passing through other parts of the spectrometer which are not shown in the drawing is detected in a detector 40.

Figure 1B:
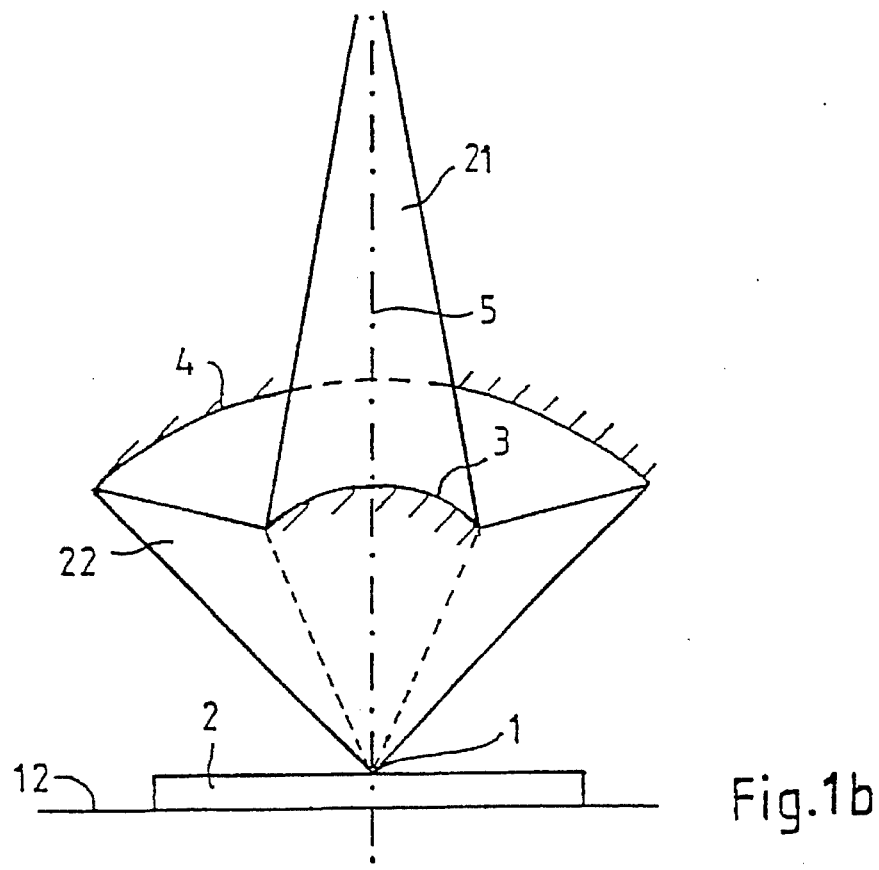
FIG. 1b shows a scheme of the optical path through a Cassegrain mirror-lens.

FIG. 1b schematically shows the optical path through a Cassegrain mirror-lens with a convex mirror 3 which is rotationally symmetric relative to optical axis 5 and through which an initially divergent luminous beam 21 which is incident on the lens is deflected onto a concave mirror 4 which is likewise rotationally symmetric with respect to the optical axis 5 and focused therefrom as incident luminous beam 22 onto a point-shaped region 1 of the measuring sample 2, which is placed on a base 12. The scattered light reflected from the point-shaped region 1 can leave the Cassegrain mirror-lens 3, 4 along an oppositely directed path and be guided to other parts of the spectrometer not shown in the drawing and finally to a detector which is also not shown. An apparatus of this kind which is per se known in the art for the application of IR spectrometers has, up to this point in time, never been utilized for the investigation of Raman light.

Figure 2A:
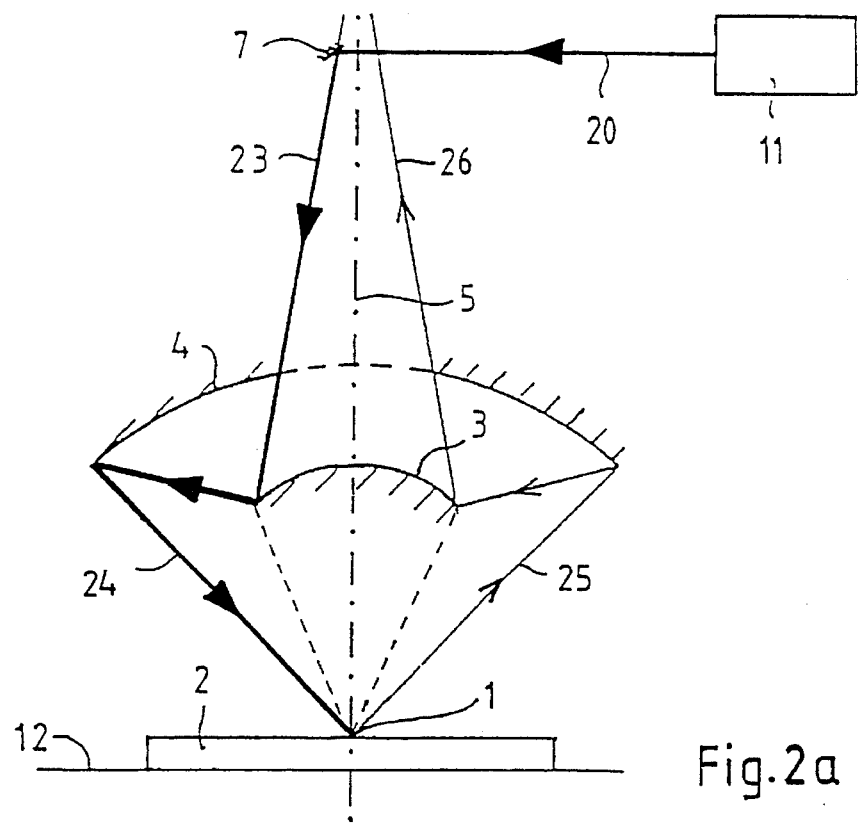
FIG. 2a shows a schematic optical path through an inventive Raman microscope with coupling-in of the laser light from above, whereby the laser beam is coupled-in into the Cassegrain mirror-lens strongly bunched and with sideward displacement from the optical axis.

In the embodiment shown in FIG. 2a) of the Raman microscope in accordance with the invention the laser beam 20 from an infrared (IR), preferentially a near-infrared (NIR), laser 11 is deflected via a planar mirror 7 arranged on the side of the Cassegrain mirror-lens 3, 4 facing away from the sample and having sideward displacement from the optical axis 5 through the Cassegrain mirror-lens 3, 4 onto the point-shaped region 1 on the surface of the measuring sample 2. The laser beam 20 exiting from the IR laser 11 is, in this embodiment, a parallel bunched beam and exhibits only a small beam diameter. The planar mirror 7, which is as completely reflecting as possible, is arranged in such a fashion that the laser beam 20 is deflected onto an envelope 23 along the optimum incident optical cone into the Cassegrain mirror-lens 3, 4 from which it exits along the path segment 24 and is incident on the point-shaped region 1 of the sample surface.

The Raman light reflected from the measuring sample 2 then travels along the path segment 25 into the Cassegrain mirror-lens 3, 4 and leaves it along a path segment 26 in the direction towards the parts of the spectrometer, not shown in the drawing, containing a detector.

Figure 2B:
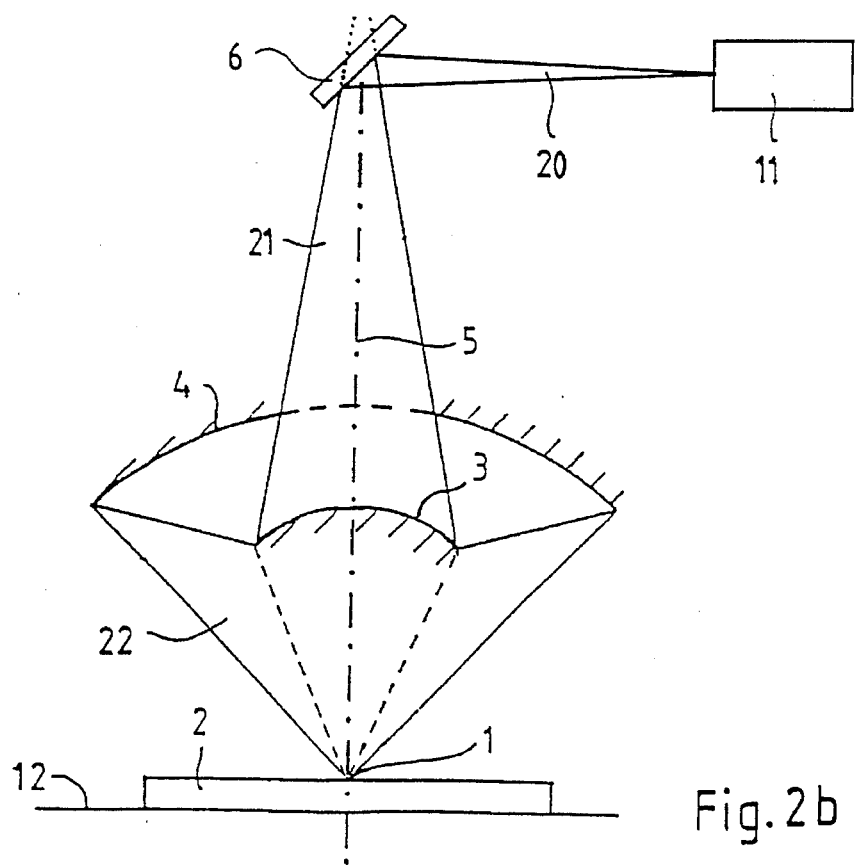
FIG. 2b shows a schematic optical path through an inventive Raman microscope with coupling-in of the laser light from above, whereby the laser beam is coupled-in into the Cassegrain mirror-lens strongly spread out along the optimal incident optical cone.

In contrast to the advantage of this embodiment of having a relatively strongly bunched laser beam directed onto the point-shaped region 1 of the measuring sample 2, is the disadvantage that a slight axial displacement of the measuring sample 2 parallel to the optical axis 5 results in the illumination of a completely different region of the sample surface. This disadvantage is not present in the embodiment of FIG. 2b) in which a laser beam 20 from an IR laser, which is already spread-out and divergent, is directed onto a semi-permeable planar mirror 6 which couples-in a luminous beam 21 symmetrically with respect to the optical axis 5 into the Cassegrain mirror lens 3, 4. The angle of divergence of the laser beam 20 and thereby of the luminous beam 21 is chosen in such a fashion that the luminous beam 21 coincides with the optimum optical cone of incidence of the Cassegrain mirror-lens 3, 4, so that the convex mirror 3 is optimally illuminated. The luminous beam 22 leaving the lens is then focused onto the point-shaped region 1 of the measuring sample 2 as in the configuration shown in FIG. 1b. The reflected or scattered Raman light travels back along the optical path in the opposite direction through the Cassegrain mirror-lens 3, 4 onto the semi-permeable mirror 6 which is reflecting for the irradiated laser radiation but transparent for the Raman radiation to be observed.

In the event of a small axial displacement of the measuring sample 2 parallel to the optical axis 5, the surface of the measuring sample 2 is still irradiated about the point-shaped region 1 whereby, however, a broadened focal spot results which, with precise alignment of the measuring sample 2, corresponds to the focal point 1.

Figure 3A:
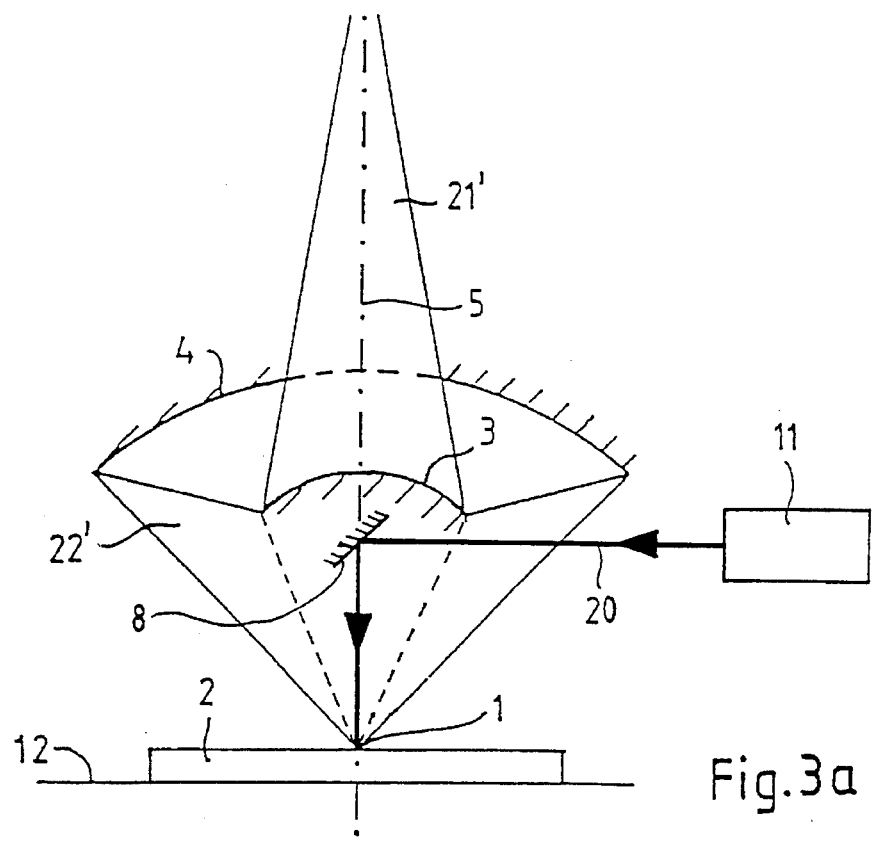
FIG. 3a shows the schematic optical path through an inventive Raman microscope with a laser beam coupled-in between the Cassegrain mirror-lens and the sample, whereby the laser beam is strongly bunched and deflected via a planar mirror onto the sample.

In the embodiments shown in FIGS. 3a) to 3c) the coupling-in of the IR laser radiation is effected via a reflector element arranged between the measuring sample 2 and the Cassegrain mirror-lens 3, 4.

FIG. 3a) shows a simple configuration with a planar mirror 8 on the optical axis between the convex mirror 3 and the measuring sample 2. In the example shown, the parallel bunched laser beam 20 from the IR laser 11 is incident, from the side onto the planar mirror 8 which is tilted by approximately 45° relative to the optical axis 5 and is deflected therefrom along the optical axis 5 onto the point-shaped region 1 on the surface of the measuring sample 2. The Raman radiation emitted from the measuring sample 2 is collected in a hollow conical region 22' of the Cassegrain mirror-lens 3, 4 and guided in a converging conical region 21' into the other parts of the Raman spectrometer which are not shown in the drawing. Thereby, on the one hand, a relatively strongly bunched laser beam 20 of concentrated intensity is introduced onto the point-shaped region 1 whereby, on the other hand, in contrast to the embodiment shown in FIG. 2a), there is no partial collimation of the scattered Raman light collected, converged, and transferred by the mirror lens.

Figure 3B:
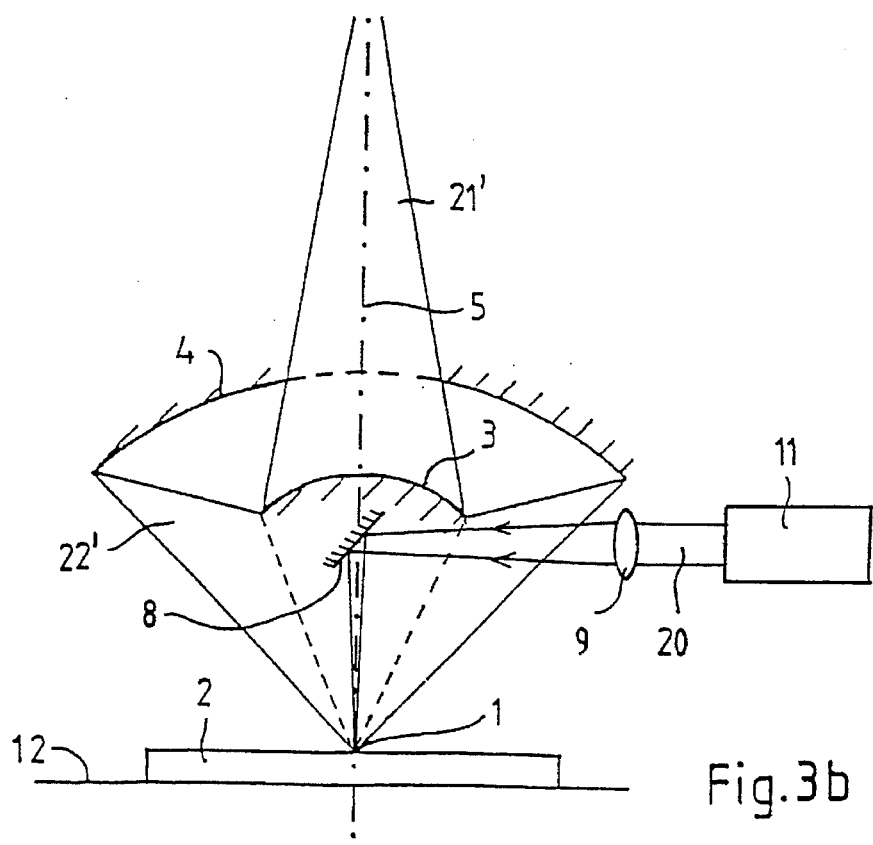
FIG. 3b shows the schematic optical path through an inventive Raman microscope with a laser beam coupled-in between the Cassegrain mirror-lens and the sample, whereby the laser beam is initially spread out, is incident on a focusing lens, and is focused onto the sample with a planar mirror.

In the embodiments shown in FIG. 3b) and 3 c) the laser radiation 20 coming from the IR laser 11 is not only deflected rather also focused. A configuration is shown in FIG. 3b) with which a rather broad parallel beam 20 exits from the IR laser 11 and is focused via a focusing lens 9 and a, an appropriately arranged planar mirror 8 , as in the embodiment of FIG. 3a), the point-shaped region 1 of the measuring sample 20. This type of widened parallel bunched laser beam 2 has, relative to a laser beam of small cross section, the advantage that it can be guided along relatively long paths without appreciable divergence. In contrast thereto, the disadvantage of absorption of a certain fraction of the laser light in the lens 9 is relatively insignificant.

Figure 3C:
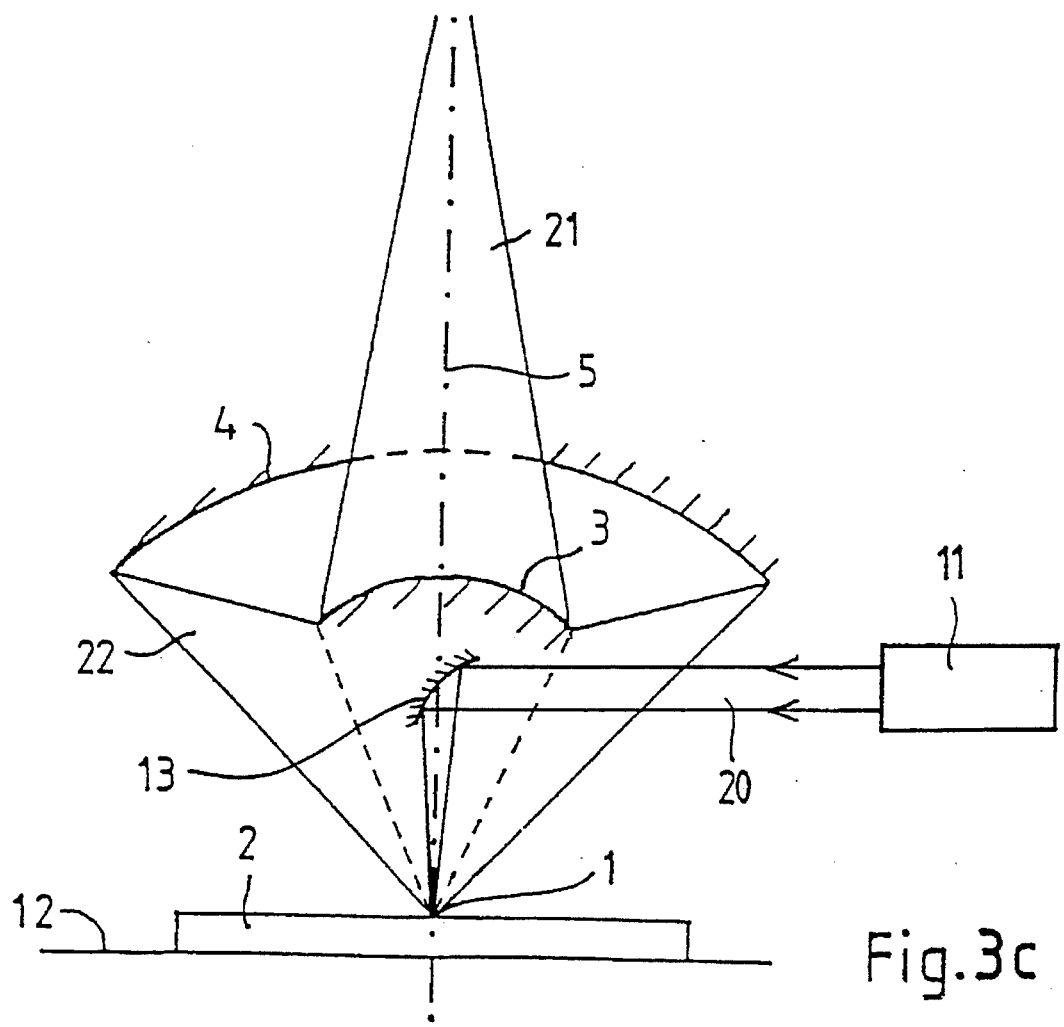
FIG. 3c shows the schematic optical path through an inventive Raman microscope with a laser beam coupled-in between the Cassegrain mirror-lens and the sample, whereby the laser beam is initially spread out and deflected with a parabolic mirror to be focused onto the sample.

Finally, FIG. 3c) shows a particularly preferred embodiment with which the reflecting element between the Cassegrain mirror-lens 3, 4 and the measuring sample 2 does not only deflect the incident parallel widened laser beam 20 rather also simultaneously focuses it onto the point-shaped region 1 of the measuring sample 2. This is achieved preferentially by means of a parabolic mirror 13 arranged at an angle of 45° with respect to the optical axis 5.

It is particularly advantageous when the planar mirror 8 or the parabolic mirror 13 exhibit a smaller spatial extent transverse to the optical axis 5 than the convex mirror 3 of the Cassegrain mirror-lens 3, 4. In this case the reflecting element 8, 13 is located in the corresponding shadow of the convex mirror 3 so that the Raman light emitted from the surface of the measuring sample 2 into the hollow cone 22' is not attenuated by reflecting element 8, 13.

We claim:

1. A Raman microscope, for a Fourier transform (FT) spectrometer, comprising: at least one of an infrared (IR) and a near-infrared (NIR) laser having laser radiation; a Cassegrain mirror-lens for magnified imaging of a point-shaped region on a surface of a measuring sample, the lens having a convex and a concave mirror arranged rotationally symmetrically with respect to a central axis of the lens; means for detecting Raman radiation emitted from the sample, the detected Raman radiation having a Raman frequency which is shifted from a laser frequency of the laser radiation; and means for transporting the laser radiation onto the point-shaped region having directing means arranged outside of a principal optical path between the sample and the detector means, whereby a focal spot of the concave mirror lies on the central axis coincident with the point-shaped region.

2. The Raman microscope of claim 1, wherein the irradiated laser radiation forms a parallel beam of small beam diameter and wherein the directing means comprises a completely reflecting planar mirror, arranged, with sideward displacement from the central axis on a side of the Cassegrain mirror-lens facing away from the sample, at an angle relative to the central axis, whereby the parallel laser beam is deflected onto the convex mirror and is incident on the point-shaped region after passing through the Cassegrain mirror-lens.

3. The Raman microscope of claim 1, wherein the directing means comprises a reflecting element arranged on the central axis between the measuring sample and the Cassegrain mirror-lens, the reflecting element being adapted to deflect a parallelly bunched laser beam irradiated largely transverse to the central axis along the central axis onto the point-shaped region.

4. The Raman microscope of claim 3, wherein the reflecting element exhibits a smaller spatial extent transverse to the central axis than the convex mirror.

5. The Raman microscope of claim 3, wherein the reflecting element is adapted to focus the incident laser radiation onto the point-shaped region.

6. The Raman microscope of claim 5, wherein the reflecting element comprises a planar mirror arranged at an angle with respect to the central axis and a focusing lens arranged in the optical path of the laser radiation upstream of the planar mirror.

7. The Raman microscope of claim 5, wherein the reflecting element is a parabolic mirror arranged at an angle of 45° relative to the central axis.

8. A Raman microscope, for a Fourier transform (FT) spectrometer, comprising: at least one of an infrared (IR) and a near-infrared (NIR) laser having laser radiation; a Cassegrain mirror-lens for magnified imaging of a point-shaped region on surface of a measuring sample, the lens having a convex and a concave mirror arranged rotationally symmetrically with respect to a central axis of the lens; means for detecting Raman radiation emitted from the sample, the detected Raman radiation having a Raman frequency which is shifted from a laser frequency of the laser radiation; and means for transporting the laser radiation onto the point-shaped region having directing means arranged outside of a principal optical path between the sample and the detector means, wherein a focal spot of the concave mirror lies on the central axis coincident with the point-shaped region and the directing means comprises a reflecting element arranged on the central axis between the measuring sample and the Cassegrain mirror-lens, the reflecting element being adapted to deflect a parallelly bunched laser beam irradiated largely transverse to the central axis along the central axis onto the point-shaped region.

9. A Raman microscope, for a Fourier transform (FT) spectrometer, comprising: at least one of an infrared (IR) and a near-infrared (NIR) laser having laser radiation; a Cassegrain mirror-lens for magnified imaging of a point-shaped region on a surface of a measuring sample, the lens having a convex and a concave mirror arranged rotationally symmetrically with respect to a central axis of the lens, means for detecting Raman radiation emitted from the sample, the detected Raman radiation having a Raman frequency which is shifted from a laser frequency of the laser radiation; and means for transporting the laser radiation onto the point-shaped region having directing means arranged outside of a principal optical path between the sample and the detector means, wherein a focal spot of the concave mirror lies on the central axis coincident with the point-shaped region and the directing means comprises a reflecting element arranged on the central axis between the measuring sample and the Cassegrain mirror-lens, the reflecting element being adapted to deflect a parallelly bunched laser beam irradiated largely transverse to the central axis along the central axis onto the point-shaped region, wherein the reflecting element is adapted to focus the incident laser radiation onto the point-shaped region and comprises a planar mirror arranged at an angle with respect to the central axis and a focusing lens arranged in an optical path of the laser radiation upstream of the planar mirror, the planar mirror having a smaller spatial extend transverse to the central axis than the convex mirror.

* * * * *